Dec. 20, 1927.  
J. SCHUMACHER  
WALL BOARD EDGE  
Filed Oct. 12, 1925

1,653,474

INVENTOR.
John Schumacher
BY Nestall and Nallace
ATTORNEYS.

Patented Dec. 20, 1927.

1,653,474

UNITED STATES PATENT OFFICE.

JOHN SCHUMACHER, OF LOS ANGELES, CALIFORNIA.

WALL-BOARD EDGE.

Application filed October 12, 1925. Serial No. 61,982.

This invention relates to a plaster board and the process of making the same, wherein the side edges are reinforced so as to aid in the handling of the board during manufacture and in its finished state. Plaster board is commonly formed of a plastic core covered by pliable sheets which eventually become bound thereto during drying and setting of the plaster core. An economical and efficient method of manufacture is the continuous method wherein the upper and lower cover sheets are continuously advanced in strips and the plastic composition interposed therebetween during the advance. The formed advancing board is cut into lengths, stacked, allowed to set, trimmed and dried. Careful handling is required of the soft board in its green state, and the edge portions of the core are easily and unintentionally disturbed and damaged requiring wasteful trimming. This invention has for its primary object the provision of means to reinforce the edge portion of the core while the board is in its green state and thereafter when finished. To this end, I have provided a reinforcing strip which is moisture absorptive, is embedded in the core and will thereby absorb some of the liquid, initially strengthening the core at the edges and also acting as a final reinforcement strip.

Figure 1:
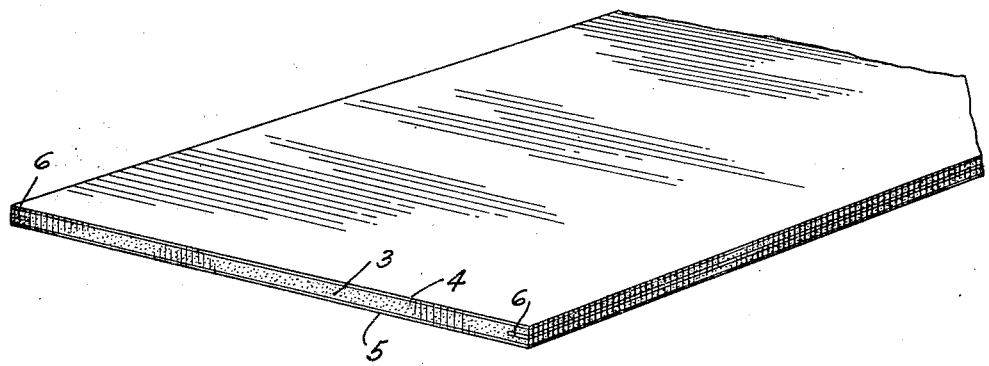
Figure 2:
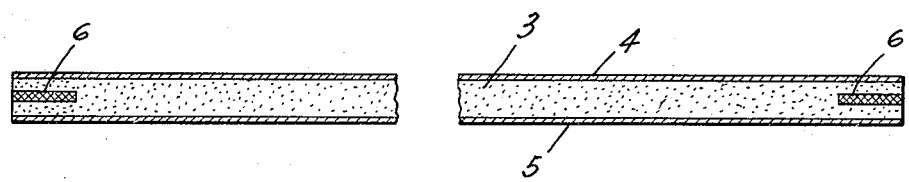

These objects together with other objects and corresponding accomplishments are obtained by means of the embodiment of my invention illustrated in the accompanying drawings, in which Fig. 1 is a perspective view of a fragment of a panel constructed in accordance with my invention; and Fig. 2 is a transverse sectional view.

Referring more particularly to the drawing, 3 indicates the usual plastic body which is commonly formed of gypsum plaster and 4 and 5 are the upper and lower cover sheets. The cover sheets are of paper and preferably are slowly permeable to moisture. The board is commonly formed by unwinding from rolls of paper the upper and lower cover sheets and interposing the wet plastic mass therebetween, passing the assembled sheets and core between forming rollers and along a conveyor built upon which the formed board is cut into panels of suitable lengths. Obviously, the board as it comes from the forming rollers is soft and the edges are subject to damage by reason of the plastic mass exuding, or under pressure becoming indented. It would be desirable to initially strengthen the edges by absorbing some of the moisture after the plastic mass has been placed in position. To this end, I insert at the edges strips of material 6 which are preferably pliable and possess appreciable tensile strength so that in their final form they will act as reinforcement strips for the core. However, the essential characteristic of the strips 6 is that they be of moisture absorptive material. A material which satisfies these requirements is an unsized paper.

During the formation of the plaster board, the strips 6 are inserted. The plastic composition may freely flow so as to be formed, but immediately after formation, a portion of the moisture is absorbed by the strips 6, thereby stiffening the core and strengthening the edge portions of the board. In this condition, the board is less subject to damage at the edges. After finally drying and in its finished form, the strips 6 act as reinforcement strips.

What I claim is:

1. A plaster board comprising a cementitious body and a strip of material at an edge thereof having a degree of absorption sufficient to take in a substantial part of the moisture from the body at the edge so as to stiffen the same.

2. An article of manufacture comprising an initially formed plaster board having a plastic body and a strip of material at the edge thereof having a degree of absorption sufficient to take in a substantial part of the moisture from said body at the edge so as to stiffen the same.

3. A plaster board comprising a cementitious body, cover sheets bound to said body, and edge strips of material extending parallel to said cover sheets and embedded in said body, said strips having a degree of absorption sufficient to take in a substantial part of the moisture at the edges of the body so as to stiffen the same.

4. An article of manufacture comprising an initially formed plaster board having a plastic body, cover sheets slowly permeable to moisture, and edge strips of material extending parallel to said cover sheets and embedded in said body, said strips having a degree of absorption sufficient to take in a substantial part of the moisture at the edges of said plastic body so as to stiffen the same.

In witness that I claim the foregoing I have hereunto subscribed my name this 28th day of September, 1925.

JOHN SCHUMACHER.